US011577766B2

(12) United States Patent
Horowitz et al.

(10) Patent No.: US 11,577,766 B2
(45) Date of Patent: Feb. 14, 2023

(54) FOLDING WAGON

(71) Applicant: Brian Horowitz, Lake Forest, CA (US)

(72) Inventors: Brian Horowitz, Mission Viejo, CA (US); William Franklin Ryczek, Pomona, CA (US)

( * ) Notice: Subject to any disclaimer, the term of this patent is extended or adjusted under 35 U.S.C. 154(b) by 0 days.

(21) Appl. No.: 15/590,942

(22) Filed: May 9, 2017

(65) Prior Publication Data

US 2018/0327011 A1    Nov. 15, 2018

(51) Int. Cl.
*B62B 3/02* (2006.01)
*B62B 5/06* (2006.01)
*B62B 3/00* (2006.01)

(52) U.S. Cl.
CPC ............... *B62B 3/02* (2013.01); *B62B 3/007* (2013.01); *B62B 3/025* (2013.01); *B62B 5/065* (2013.01); *B62B 5/067* (2013.01); *B62B 2205/06* (2013.01)

(58) Field of Classification Search
CPC .......... B62B 3/02; B62B 3/027; B62B 5/065; B62B 5/064; B62B 2202/66; B62B 2205/06; B62B 2206/02
See application file for complete search history.

(56) References Cited

U.S. PATENT DOCUMENTS

| 915,032 | A | * | 3/1909 | Lannert | B62B 3/02 280/640 |
|---|---|---|---|---|---|
| 961,234 | A | | 6/1910 | Hoover | |
| 1,335,122 | A | | 3/1920 | Mahr | |
| 1,432,114 | A | | 10/1922 | Mahr | |
| 2,020,766 | A | | 11/1935 | Brown | |
| 2,728,585 | A | | 12/1955 | Walline | |
| 3,100,652 | A | | 8/1963 | Schenkman | |
| 3,625,381 | A | | 12/1971 | Menzi | |
| 4,693,628 | A | * | 9/1987 | Renk | B60G 7/005 403/135 |
| 4,761,847 | A | * | 8/1988 | Savage | B65G 69/30 108/167 |
| 4,815,889 | A | * | 3/1989 | Duckett | E01F 15/006 256/13.1 |
| 4,846,432 | A | * | 7/1989 | Skewis | A47B 21/03 248/235 |

(Continued)

FOREIGN PATENT DOCUMENTS

JP    2004-249749    9/2004

*Primary Examiner* — Frank B Vanaman
(74) *Attorney, Agent, or Firm* — Morland C. Fischer

(57) ABSTRACT

A folding wagon comprising a collapsible wagon basket, a folding wagon frame comprising folding ends and folding sides, wherein the folding ends and the folding sides connect at four corners, each corner comprising a vertical frame element, wherein the vertical frame elements are extendable to enable the folding the wagon to transform from an extended configuration to a collapsed configuration, a folding base formed by a plurality of base support elements that are hingedly attached to the vertical frame elements and hingedly attached to a central base element, wherein the hinged attachments of the base support elements to the vertical frame elements are multi-directional hinges allowing multiple degrees of freedom in the movement of the base support elements when the folding wagon is transformed from the extended configuration to the collapsed configuration, a handle attached to the first folding end, and a plurality of wheels.

8 Claims, 7 Drawing Sheets

(56) References Cited

U.S. PATENT DOCUMENTS

| | | | | |
|---|---|---|---|---|
| 5,123,665 | A * | 6/1992 | Levy | B62B 3/022 211/201 |
| 5,769,681 | A * | 6/1998 | Greenwood, Sr. | A63H 33/062 446/120 |
| 5,806,827 | A | 9/1998 | Gilmore | |
| 5,820,189 | A * | 10/1998 | Tew | B60P 3/341 296/26.11 |
| 5,876,047 | A | 3/1999 | Dennis | |
| 5,887,879 | A | 3/1999 | Chumley | |
| 5,915,723 | A | 6/1999 | Austin | |
| 5,979,102 | A | 11/1999 | Sagryn | |
| 6,027,128 | A | 2/2000 | Stich et al. | |
| 6,217,043 | B1 | 4/2001 | Chumley | |
| 6,263,893 | B1 | 7/2001 | Spinella et al. | |
| 6,409,029 | B1 | 6/2002 | Bermes | |
| 6,491,318 | B1 * | 12/2002 | Galt | B62B 3/02 280/42 |
| 6,845,991 | B1 | 1/2005 | Ritucci et al. | |
| 7,000,928 | B2 | 2/2006 | Liao | |
| 7,004,481 | B1 | 2/2006 | Stanish | |
| 7,523,955 | B2 | 4/2009 | Blair | |
| 7,530,581 | B1 | 5/2009 | Squires, Sr. | |
| 7,547,037 | B2 | 6/2009 | Poppinga et al. | |
| 7,871,099 | B2 | 1/2011 | Gilbertson et al. | |
| 7,963,530 | B1 | 6/2011 | Garcia | |
| 8,011,686 | B2 | 9/2011 | Chen et al. | |
| 8,162,349 | B1 * | 4/2012 | Roselle | B62B 1/008 280/639 |
| 8,220,824 | B2 | 7/2012 | Chen et al. | |
| 8,464,731 | B1 * | 6/2013 | Eberlein | A45D 40/221 132/301 |
| 8,465,031 | B2 | 6/2013 | Coghill, Jr. | |
| 8,567,810 | B2 | 10/2013 | Abecassis et al. | |
| 8,746,377 | B1 | 6/2014 | Dunbar | |
| 8,882,135 | B1 | 11/2014 | Chen | |
| 8,894,090 | B1 | 11/2014 | Chen | |
| 8,973,940 | B2 | 3/2015 | Chen et al. | |
| 8,998,246 | B2 | 4/2015 | Griffard | |
| 9,056,621 | B1 | 6/2015 | Jin | |
| 9,085,311 | B1 | 7/2015 | Chen | |
| 9,101,206 | B1 | 8/2015 | Chen | |
| 9,108,656 | B1 * | 8/2015 | Nolan | B62B 3/02 |
| 9,145,154 | B1 | 9/2015 | Horowitz | |
| 2002/0074834 | A1 * | 6/2002 | Summar | A47C 4/286 297/16.2 |
| 2002/0140190 | A1 | 10/2002 | Shapiro | |
| 2003/0025301 | A1 | 2/2003 | Banuelos, III | |
| 2003/0234501 | A1 | 12/2003 | Cohen | |
| 2004/0155434 | A1 * | 8/2004 | Haury | A61G 5/08 280/647 |
| 2005/0110317 | A1 * | 5/2005 | Britton | B62B 7/06 297/255 |
| 2005/0270475 | A1 * | 12/2005 | Curci | G02C 5/2263 351/69 |
| 2005/0275195 | A1 | 12/2005 | Matula et al. | |
| 2008/0129016 | A1 | 6/2008 | Willis | |
| 2009/0115167 | A1 | 5/2009 | Chin | |
| 2010/0059950 | A1 | 3/2010 | Coghill, Jr. | |
| 2010/0090444 | A1 * | 4/2010 | Chen | B62B 3/007 280/651 |
| 2010/0156069 | A1 | 6/2010 | Chen | |
| 2010/0187034 | A1 | 7/2010 | Wang | |
| 2011/0204598 | A1 | 8/2011 | Stevenson | |
| 2011/0285112 | A1 | 11/2011 | Chen et al. | |
| 2012/0274052 | A1 | 11/2012 | Zhu | |
| 2013/0103245 | A1 | 4/2013 | Lee et al. | |
| 2013/0234476 | A1 | 9/2013 | Smith | |
| 2013/0274684 | A1 * | 10/2013 | Bubenik | A61M 5/3216 604/263 |
| 2014/0001735 | A1 * | 1/2014 | Yang | B62B 3/02 280/651 |
| 2014/0300155 | A1 * | 10/2014 | Lehman | B60N 2/2806 297/256.16 |
| 2014/0353945 | A1 | 12/2014 | Young et al. | |
| 2015/0145224 | A1 * | 5/2015 | Zhu | B62B 3/025 280/42 |
| 2015/0151771 | A1 * | 6/2015 | Jin | B62B 3/027 280/651 |

* cited by examiner

FOLDING WAGON

FIELD OF INVENTION

This invention relates to a folding wagon having a fabric basket within which to carry a variety of articles or small children, folding sides, folding ends, and a folding base. The folding sides, folding ends, and folding base each collapse drawing the corners of the folding wagon towards the center of the wagon when the folding wagon is folded from an extended open configuration during use to a compact collapsed configuration to facilitate transport and/or storage of the wagon when it is not being used.

BACKGROUND

It is known for basket-carrying wagons to be folded and unfolded between extended and collapsed configurations. However, foldable wagons only collapse in one dimension, typically lengthwise. Collapsing only the longest dimension of the wagon does not achieve the smallest possible footprint for the folding wagon, so the collapsed wagon fills takes up more room during transportation and storage. Storage space in the user's home and space in the user's vehicle during transportation, is typically packed with various other items used during outdoor activities. Making more space available to more easily store and transport these items is desirable.

The space consumed by conventional folding wagons is typically restricted by folding mechanisms, specifically, by the supports that form the frame of the wagon and the hinges that enable the wagons to fold. Wagons are designed having a longer dimension along the length of the wagon and a shorter dimension across the width of the wagon. While this configuration is highly functional when the wagon is deployed, it only allows folding in one dimension of the wagon, because conventional hinges employ pins or rods which only allow for one degree of freedom in movement of the hinge. Attempting to design a conventional folding wagon that collapses in the longer dimension and the shorter dimension creates a misalignment between the direction or folding and the motion of one or more of the hinges used to fold the wagon.

Accordingly, it would be desirable to have available an improved folding wagon that overcomes the disadvantages that are described above and remain common to conventional folding wagons.

SUMMARY

The present disclosure is directed to folding wagons, substantially as shown in and/or described in connection with at least one of the figures, as set forth more completely in the claims. An improved folding wagon is disclosed, including a collapsible wagon basket formed from cloth material and a folding wagon frame. The folding wagon frame comprises folding ends and folding sides, wherein the folding ends and the folding sides connect at four corners, each corner comprising a vertical frame element. The vertical frame elements are extendable to enable the folding the wagon to transform from an extended configuration to a collapsed configuration. The folding wagon includes a folding base formed by a plurality of base support elements that are hingedly attached to the vertical frame elements and hingedly attached to a central base element, wherein the hinged attachments of the base support elements to the vertical frame elements are multi-directional hinges allowing multiple degrees of freedom in the movement of the base support elements when the folding wagon is transformed from the extended configuration to the collapsed configuration. The folding wagon includes a handle for pulling the wagon and a plurality of wheels.

When the wagon is transformed from the extended configuration to the collapsed configuration, the central base element moves upward and draws the corners of the folding wagon towards the center of the wagon. The folding ends and folding sides collapse so that the folding members of the folding ends and folding sides, and the support elements of the folding base, all approach a vertical position. To accommodate this compact arrangement, the vertical frame elements extend in length.

The folding wagon optionally includes extendable canopy supports for connecting to and supporting a canopy above the wagon basket. The extendable canopy supports may telescopically extend from the vertical frame elements at each corner of the folding wagon, and may be nested inside the extendable vertical frame elements when they are not extended for use. A fabric canopy may have a top panel, and four sidewalls forming four corners. Each of the four corners receives one of the four extendable canopy supports.

The handle assembly can be connected to the front of the wagon for manual control. The handle may be a collapsible handle with an extended position for use pulling the folding wagon, and a stowed position for storing the handle when the folding wagon is collapsed for transportation or storage. The two wheels attached to the end of the wagon having the handle may be rotatably attached, so that they will rotate to follow in the direction a user is pulling the handle, allowing the user to steer the wagon. The wheels attached to the end of the wagon opposite the handle may be fixed in one direction.

DETAILED DESCRIPTION

Figure 1:
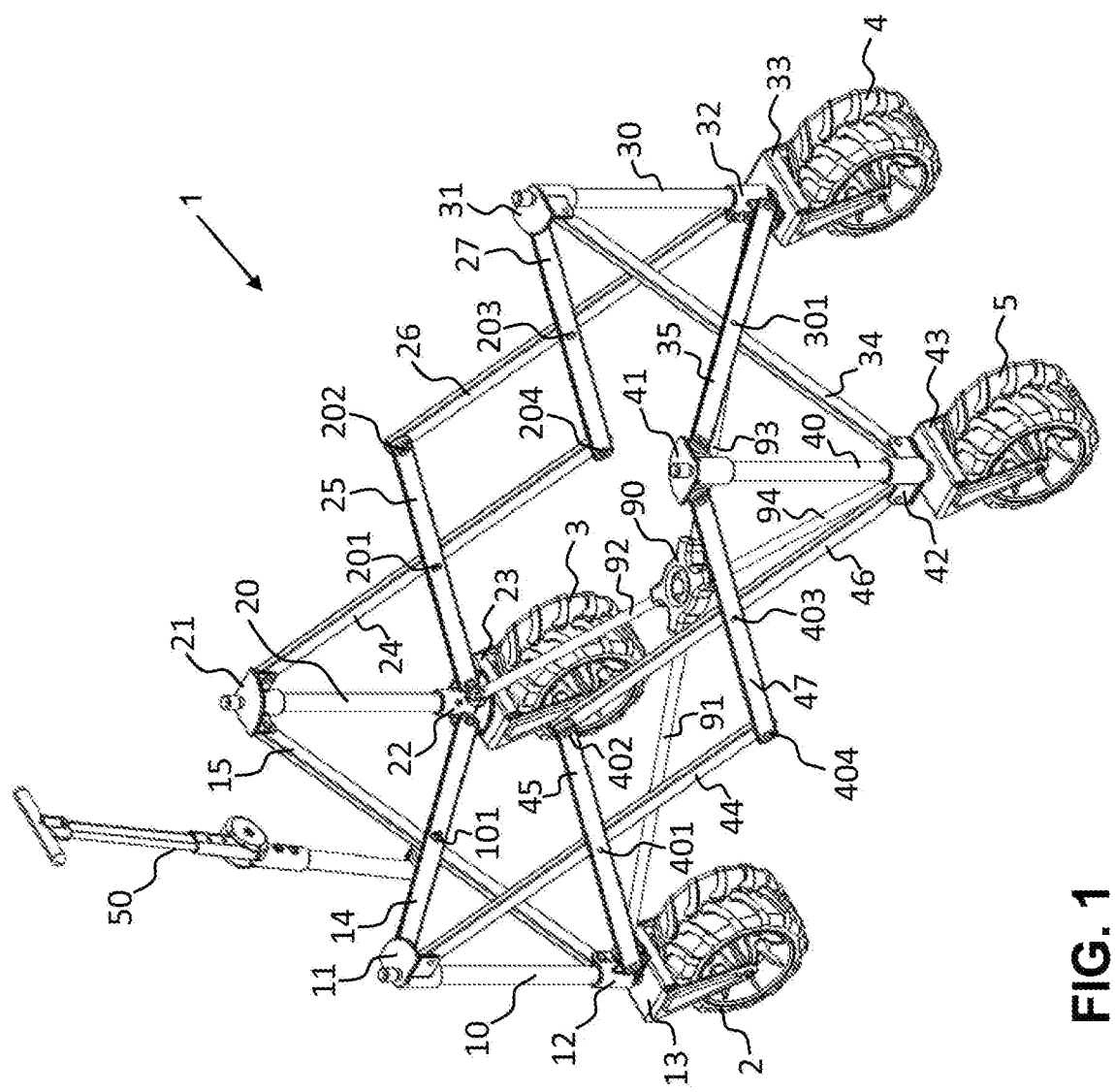
FIG. 1 shows a diagram of an exemplary folding wagon in an extended configuration, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not necessarily intended to correspond to actual relative dimensions.

FIG. 1 shows a diagram of folding wagon 1 in an extended configuration, according to one implementation of the present disclosure. Folding wagon 1 may comprise a collapsible cloth material wagon basket (not shown) for holding and carrying items and a folding wagon frame. The collapsible wagon basket may be made using canvas, nylon, or other durable cloth or cloth- like material, as known in the art. For ease of showing details and components of the folding wagon frame, the collapsible wagon basket is not shown. Folding wagon 1 includes a collapsible wagon frame formed by vertical frame element 10, vertical frame element 20, vertical frame element 30, and vertical frame element 40. Each vertical frame element 10, 20, 30, 40 may form a corner of the collapsible wagon frame, wherein each corner may be the intersection of an end of folding wagon 1 and a side of folding wagon 1. In some implementations, vertical frame elements 10, 20, 30, 40 may be extendable, such that when folding wagon 1 is collapsed from the extended configuration shown in FIG. 1 to a collapsed configuration, each of vertical frame elements 10, 20, 30, 40 may extend to increase the distance between the lower end and the upper end of the vertical frame elements. For example, vertical frame element 10 may include an inner element and an outer element and vertical frame element 10 may increase in length when the inner element moves relative to the outer element, e.g., vertical frame element 10 may increase in length telescopically when folding wagon 1 is transformed from the extended configuration to the collapsed configuration. Vertical frame elements 20, 30, 40 may include corresponding inner and outer elements, and may correspondingly extend when folding wagon 1 is transformed from the extended configuration to the collapsed configuration.

As shown in FIG. 1, vertical frame element 10 has upper hinge element 11 attached at an upper end of vertical frame element 10. Upper hinge element 11 may be used to connect one or more frame elements of the side and/or end of folding wagon 1 to vertical frame element 10. Vertical frame elements 20, 30, 40 may include corresponding upper hinge elements 21, 31, 41.

As shown in FIG. 1, vertical frame element 10 has lower hinge element 12 attached at a lower end of vertical frame element 10. Lower hinge element 12 may be used to connect one or more frame elements of the side and/or end of folding wagon 1 to vertical frame element 10. Vertical frame elements 20, 30, 40 may include corresponding lower hinge elements 22, 32, 42.

As shown in FIG. 1, wheel mount 13 is attached to folding wagon 1 at the lower end of vertical frame element 10. In some implementations, wheel mount 13 may be attached to the lower end of vertical frame element 10 in a way that allows wheel mount 13 to rotate, such that when a user is pulling folding wagon 1, the wagon may change directions allowing the user to steer folding wagon 1. In some implementations, wheel mount 13 and wheel mount 23 may be rotatably attached to folding wagon 1 and wheel mount 33 and wheel mount 43 may be attached with a fixed orientation, such that when folding wagon 1 is pulled by a user, wheel mount 13 and wheel mount 23 may change directions based on the direction the user is pulling handle 50 and wheel mount 33 and wheel mount 43 will remain in the fixed orientation as the user pulls folding wagon 1 by handle 50. In other implementations, all four of wheel mounts 13, 23, 33, 43 may be rotatably attached to folding wagon 1.

FIG. 1 depicts a first end of folding wagon 1 formed by vertical frame member 10, vertical frame member 20, folding member 14, and folding member 15. Folding member 14 is movably connected to vertical frame member 10 at upper hinge element 11 and to vertical frame element 20 at lower hinge element 22. Folding member 15 is movably connected to vertical frame member 10 at lower hinge element 12 and to vertical frame element 20 at upper hinge element 21. Folding member 14 diagonally crosses and is movably attached to folding member 15 at folding joint 101, such as by a hinge, a pin, or other rotationally movable connection.

FIG. 1 depicts a second side of folding wagon 1 formed by vertical frame element 20, vertical frame element 30, folding member 24, folding member 25, folding member 26, and folding member 27. Folding member 24 is movably connected to vertical frame member 20 at upper hinge element 21 and to folding member 27 at lower folding joint 204. Folding member 25 is movably connected to vertical frame member 20 at lower hinge element 22 and to folding member 26 at upper folding joint 202. Folding members 24 and 25 diagonally cross and are movably connected at folding joint 201. Folding member 27 is movably connected at lower folding joint 204 and movably connected to vertical frame element 30 at upper hinge element 31. Folding member 26 is movably connected to upper folding joint 202 and movably connected to vertical frame element 30 at lower hinge element 32. Folding members 26 and 27 diagonally cross at are movably connected at folding joint 203.

As shown in FIG. 1, a first side of folding wagon 1 is formed by vertical frame element 10, vertical frame element 40, folding member 44, folding member 45, folding member 46, and folding member 47. Folding member 44 is movably connected to vertical frame member 10 at upper hinge element 11 and to folding member 47 at lower folding joint 404. Folding member 45 is movably connected to vertical frame member 10 at lower hinge element 12 and to folding member 46 at upper folding joint 402. Folding members 44 and 45 diagonally cross and are movably connected at folding joint 401. Folding member 47 is movably connected at lower folding joint 404 and movably connected to vertical frame element 40 at upper hinge element 41. Folding member 46 is movably connected to upper folding joint 402 and movably connected to vertical frame element 40 at lower hinge element 42. Folding members 46 and 47 diagonally cross at are movably connected at folding joint 403.

FIG. 1 depicts a second side of folding wagon 1 formed by vertical frame element 20, vertical frame element 30, folding member 24, folding member 25, folding member 26, and folding member 27. Folding member 24 is movably connected to vertical frame member 20 at upper hinge element 21 and to folding member 27 at lower folding joint 204. Folding member 25 is movably connected to vertical frame member 10 at lower hinge element 22 and to folding member 26 at upper folding joint 202. Folding members 24 and 25 diagonally cross and are movably connected at folding joint 201. Folding member 27 is movably connected at lower folding joint 204 and movably connected to vertical frame element 30 at upper hinge element 31. Folding member 26 is movably connected to upper folding joint 202 and movably connected to vertical frame element 30 at lower hinge element 32. Folding members 26 and 27 diagonally cross at are movably connected at folding joint 203.

As shown in FIG. 1, folding wagon 1 includes a folding base formed by base support element 91, base support element 92, base support element 93, base support element 94, and central base element 90. The folding base is a substantially planar base formed when folding wagon 1 is transformed from the collapsed configuration to the extended configuration. Base support element 91 is hingedly connected to lower hinge element 12 at one end, and at the other end, base support element 91 is hingedly connected to central base element 90. Base support element 92 is hingedly connected to lower hinge element 22 at one end, and at the other end, base support element 92 is hingedly connected to central base element 90. Base support element 93 is hingedly connected to lower hinge element 32 at one end, and at the other end, base support element 93 is hingedly connected to central base element 90. Base support element 94 is hingedly connected to lower hinge element 42 at one end, and at the other end, base support element 94 is hingedly connected to central base element 90. Base support elements 91, 92, 93, 94 are held in place by lower hinge elements 12, 22, 32, 42, respectively, at the corners, and by central base element 90 in the middle of the folding base.

Folding wagon 1 includes handle 50. As shown in FIG. 1, handle 50 is attached to the first end of folding wagon 1. Handle 50 may be an extendable handle having an extended configuration in which a user may use handle 50 to pull folding wagon 1. Handle 50 may have a collapsed configuration for stowing handle 50 when folding wagon 1 is collapsed, for example, during transportation and/or storage of folding wagon 1. As shown in FIG. 1, folding wagon 1 includes four (4) wheels. Wheel 2 is attached to folding wagon 1 by wheel mount 13, wheel 3 is attached to folding wagon 1 by wheel mount 23, wheel 4 is attached to folding wagon 1 by wheel mount 33, and wheel 5 is attached to folding wagon 1 by wheel mount 43. Folding wagon 1 may optionally include extendable canopy supports, which may be extended from a stowed position to a deployed position (not shown) to support a canopy over the collapsible wagon basket of folding wagon 1. In some implementations, the extendable canopy supports may be used as anchors to attach the collapsible wagon basket to the folding frame.

Figure 2:
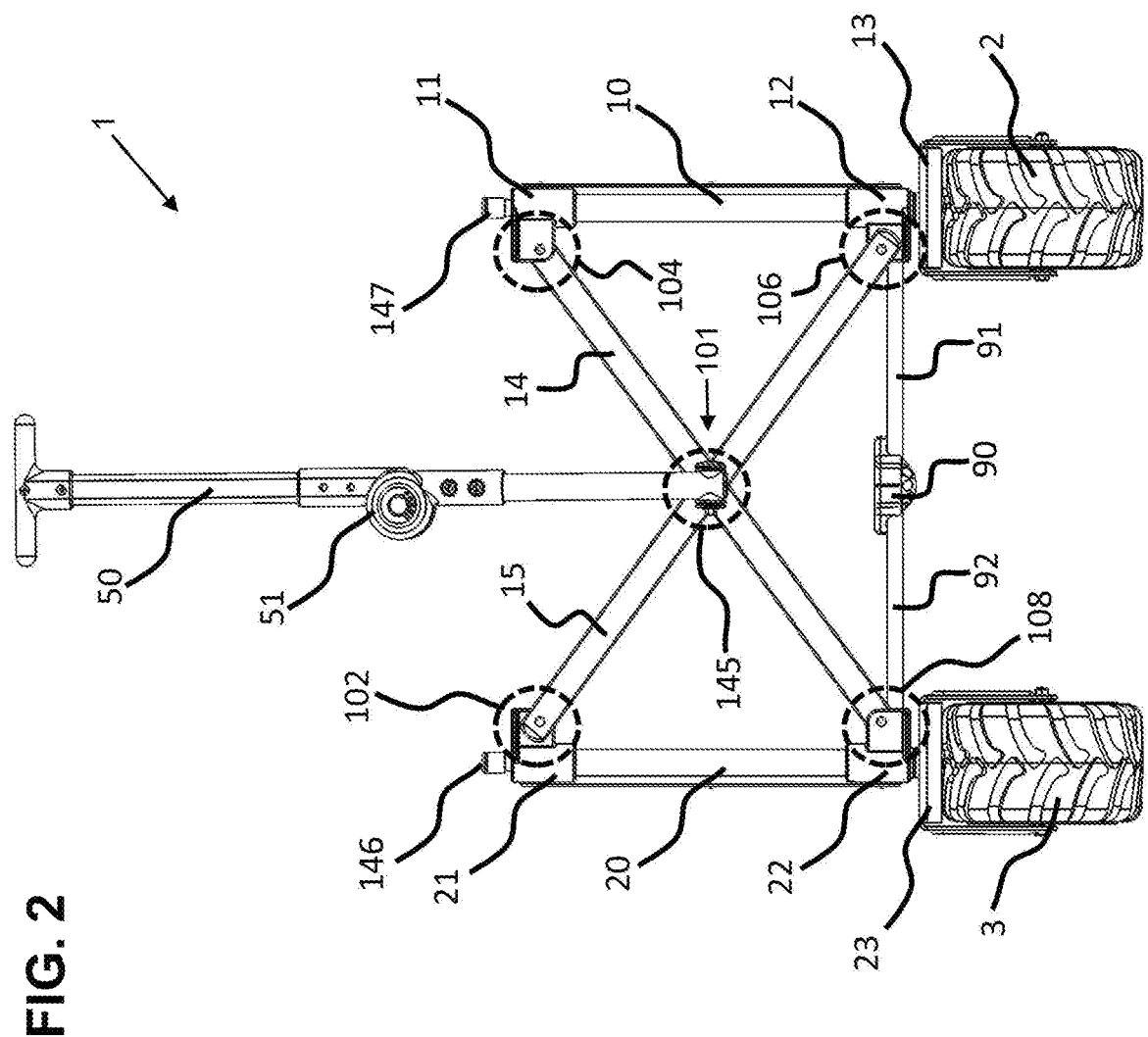
FIG. 2 shows a diagram of a front view of the exemplary folding wagon of FIG. 1, according to one implementation of the present disclosure.

FIG. 2 shows a diagram of a front view of folding wagon 1, according to one implementation of the present disclosure. The front view of folding wagon 1 shows the first end of wagon 1, including vertical frame element 10, vertical frame element 20, upper hinge element 11, upper hinge element 21, lower hinge element 12, lower hinge element 22, wheel mount 13, wheel mount 23, folding member 14, folding member 15, hinged connection 102, hinged connection 104, hinged connection 106, hinged connection 108, and handle connection 145. As shown in FIG. 2, folding member 14 is attached to vertical frame element 20 at lower hinge element 22 by hinged connection 108 and crosses the first end of the wagon diagonally upward to connect with vertical frame element 10 at upper hinge element 11 by hinged connection 104. Folding member 15 is connected to vertical frame element 10 at lower hinge element 12 by hinged connection 106 and crosses the first end of folding wagon 1 diagonally to connect with vertical frame element 20 at upper hinge element 21 by hinged connection 102. Folding member 14 diagonally crosses folding element 15 and is movably attached thereto at folding joint 101, for example, by a pin, a rivet, or other rotational connection that may form a pivot.

Handle connection 145 connects to the first end of folding wagon 1 at folding joint 101, which is the intersection of folding member 14 and folding member 15. Handle 50 includes folding joint 51, which allows the user to collapse handle 50 from an extended configuration to a collapsed configuration (not shown). Folding joint 51 may be a rotational folding joint, allowing a second portion of handle 50 to rotate from an extended configuration to a collapsed configuration. When handle 50 is in the collapsed configuration, the second portion of handle 50 may rotate to such that the pulling grip is positioned next to folding joint 101, and the first portion and second portion of handle 50 are substantially parallel. The collapsed configuration of handle 50 may be about one half of the length of the extended configuration of handle 50.

As shown in FIG. 2, folding wagon 1 includes extendable canopy support 146 and extendable canopy support 147. Canopy support 146 and canopy support 147 may extend upward out of vertical frame element 20 and vertical frame element 10, respectively. For example, extendable canopy support 146 and extendable canopy support 147 may extend upwards to a deployed position where extendable canopy support 146 and extendable canopy support 147 connect to and support a canopy that is positioned above the collapsible basket (not shown) of folding wagon 1. Wheels 2 and 3, support base elements 91 and 92, and central base element 90 are also visible in the front view depicted by FIG. 2.

Figure 3:
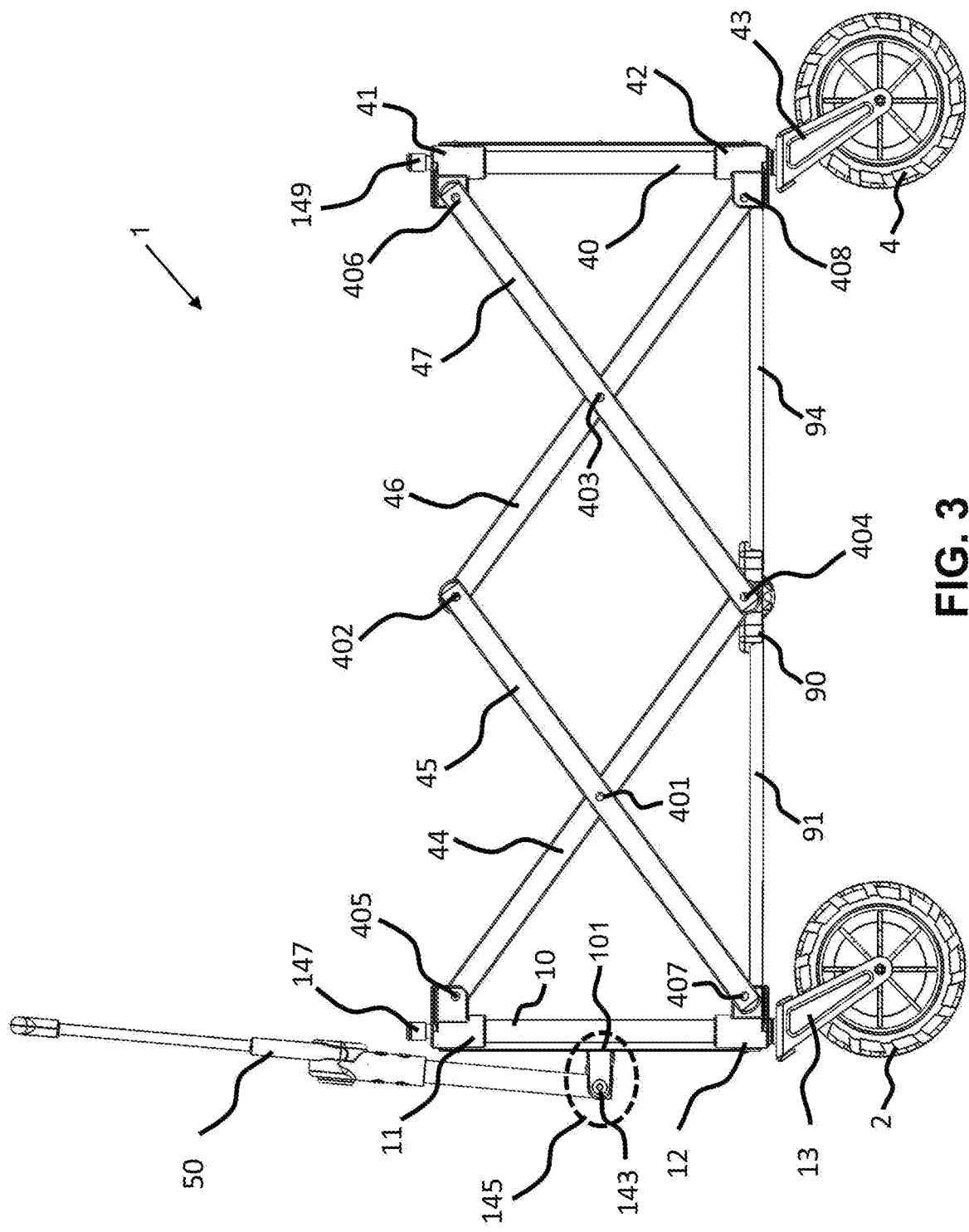
FIG. 3 shows a diagram of a side view of the exemplary folding wagon of FIG. 1, according to one implementation of the present disclosure.

FIG. 3 shows a diagram of a side view of folding wagon 1, according to one implementation of the present disclosure. Handle 50 is deployed in the extended position and connected to folding wagon 1 by handle connection 145 at folding joint 101. In some implementations, handle 50 may be rotatable in the plane parallel to the first end of folding wagon 1, such as when handle 50 rotates around an axis that passes through folding joint 101. The axis that passes through the folding joint may be substantially perpendicular to the plane of the first end of folding wagon 50. Handle 50 may rotate through an angle that is perpendicular to the plane of the first end of folding wagon 1 when handle 50 rotates around handle axis 143. Handle axis 143 is substantially perpendicular to the axis passing through folding joint 101 and connecting handle connection 145 to the first end of folding wagon 1. The combination of rotating handle connection 145 and handle axis 143 allow handle 50 to rotate to almost any angular position in front of the first end of folding wagon 1. Wheel mount 13 and wheel mount 23 may allow wheel 2 and wheel 3 to rotate to follow the direction that the user is pulling folding wagon 1 using handle 50.

The first side of folding wagon 1 is shown in FIG. 3. Folding member 44 attaches to upper hinge element 11 at movable connection 405 and attaches to folding member 47 at lower folding joint 404. Folding member 45 attaches to lower hinge element 12 at movable connection 407 and attaches to folding member 46 at upper folding joint 402. Folding member 44 and folding member 45 are movably connected at folding joint 401. Folding member 46 attaches to folding member 45 at upper folding joint 402 and attaches to lower hinge element 42 at movable connection 408. Folding member 47 attaches to folding member 44 at lower folding joint 404 and attaches to upper hinge element 41 at movable connection 406. Folding member 46 and folding member 47 are movably connected at folding joint 403. As shown in FIG. 3, wheel mount 13 and wheel mount 43 hold wheel 2 and wheel 4, respectively, and extendable canopy supports 147 and 149 are in a stowed position. In some implementations, extendable canopy supports 146, 147, 148, 149 extend upwardly and hold a canopy above the collapsible wagon basket, connecting to the canopy and holding the canopy in place using a pressure connection and knobs at the upper ends of each extendable canopy support.

Figure 4:
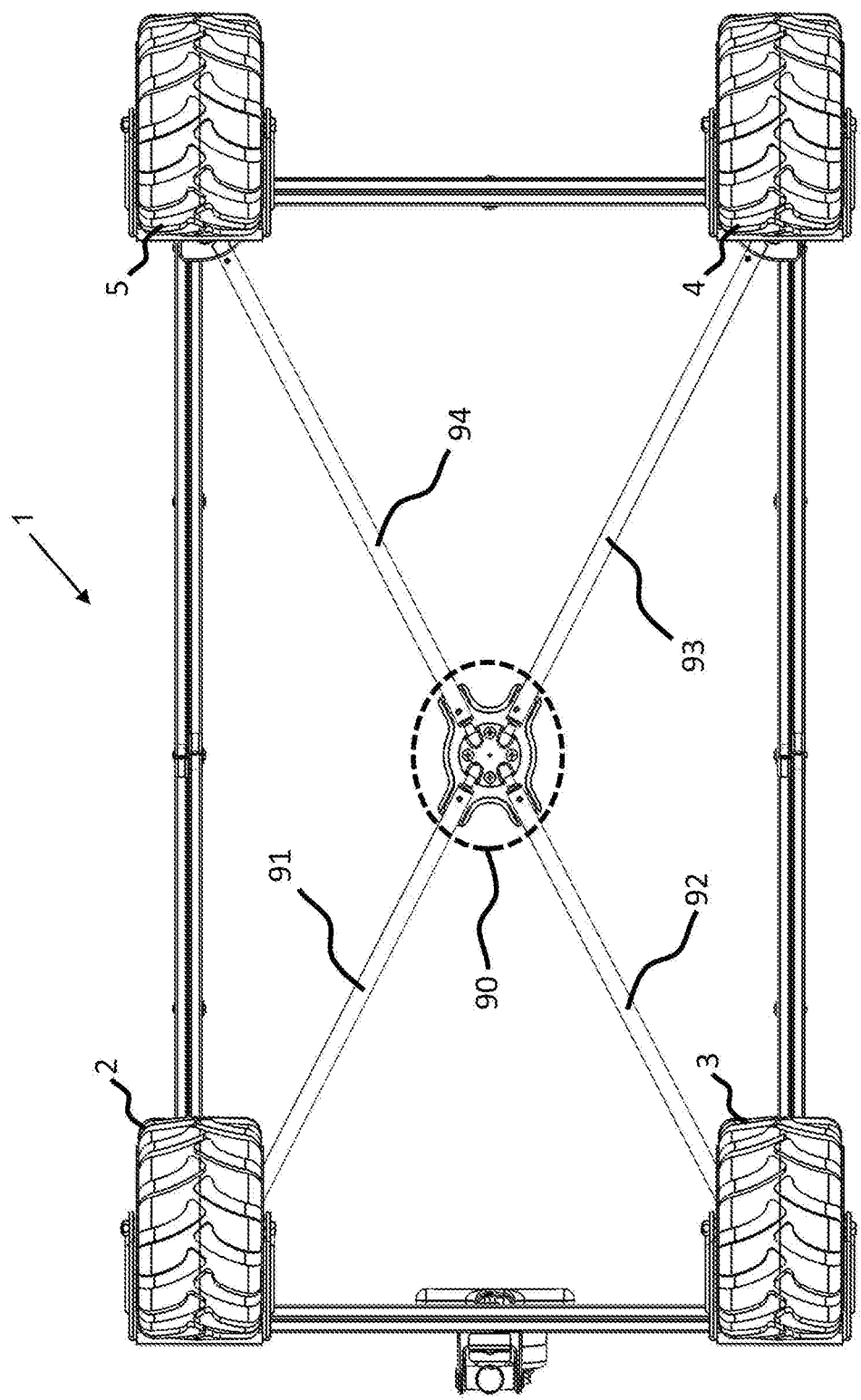
FIG. 4 shows a diagram of a bottom view of the exemplary folding wagon of FIG. 1, according to one implementation of the present disclosure.
Figure 5:
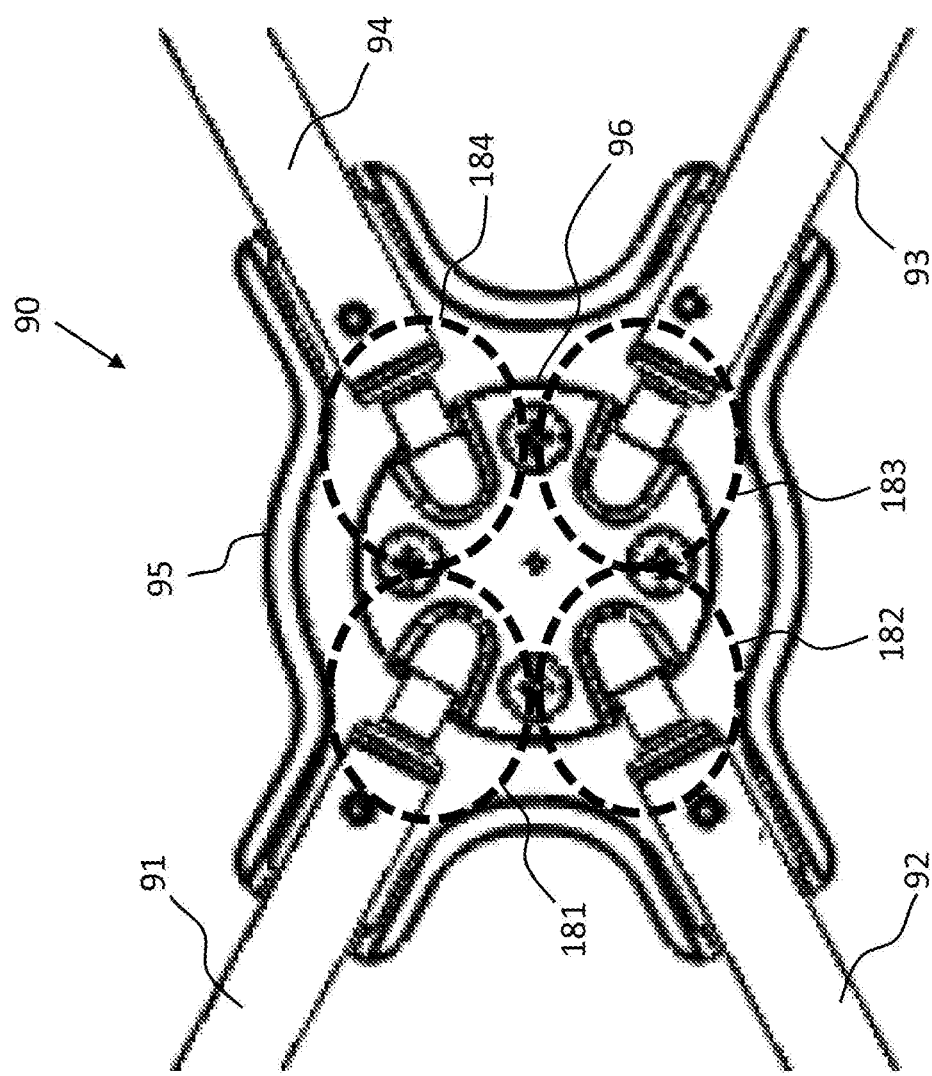
FIG. 5 shows a diagram of a bottom view of a central base element of the folding wagon of FIG. 1, according to one implementation of the present disclosure.

FIG. 4 shows a bottom view of folding wagon 1, according to one implementation of the present disclosure. The bottom view shows folding wagon 1 in the extended configuration. Central base element 90 is hingedly attached to base support elements 91, 92, 93, and 94. Each base support element extends from central base element 90 to one of the four corners of the base of folding wagon 1, where each base support element is hingedly attached to a corresponding lower hinge element. As shown in FIG. 5, central base element is configured to engage each of the base support elements and includes a central base element body 95 extending outwardly from a center of the central base element towards the sides and corners of the base of folding wagon 1. The central base element body 95 is substantially planar, such that when folding wagon 1 is deployed from the collapsed position to the extended position, base support elements 91, 92, 93, 94 come to rest and are held in place by the opposition of the hinged attachments and central base element body 95.

FIG. 5 shows a diagram of a bottom view of central base element 90, according to one implementation of the present disclosure. FIG. 5 shows base support element 91, base support element 92, base support element 93, and base support element 94 hingedly attached to central base element 90 at corresponding hinged attachment 181, hinged attachment 182, hinged attachment 183, and hinged attachment 184. Each of base support elements 91, 92, 93, 94 are round support elements having a spherical-shaped ball at each end for connecting to central base element 90 and one of lower hinge elements 13, 23, 33, 43. The hinged connection may be accomplished using a ball-and-socket connection. Such a connection may allow for more degrees of freedom in the movement of the base support elements when folding wagon 1 is being transformed from the collapsed configuration to the extended configuration. The ball-and-socket connection allows for multiple degrees of freedom in the movement of each base support elements 91, 92, 93, 94, including at least one angular degree of freedom and a rotational degree of freedom. For example, the ball-and-socket connection allows each base support element 91, 92, 93, 94 to rotate independently and/or to move through vertical of between and horizontal angles, such that the angular motion of each base support element is not constrained to a plane, i.e., each base support elements can move through a solid angle. Base support elements 91, 92, 93, 94 may move though a vertical angle of up to about ninety (90) degrees, such that they are substantially horizontal when in the extended configuration, and nearly vertical when in the collapsed configuration.

In some implementations, central base element body 95 may include a directional channel corresponding to each base support element 91, 92, 93, 94, wherein the directional channel may provide lateral support and stability to each of base support elements 91 92, 93, 94 when folding wagon 1 is in the extended configuration. In some implementations, central base element 90 may include central base element body 95 and hinge attachment 96. Hinge attachment 96 may include sockets for receiving a ball-end of each of support base elements 91, 92, 93, 94, and together therewith, forming the ball-and-socket connection of central base element 90.

Figure 6:
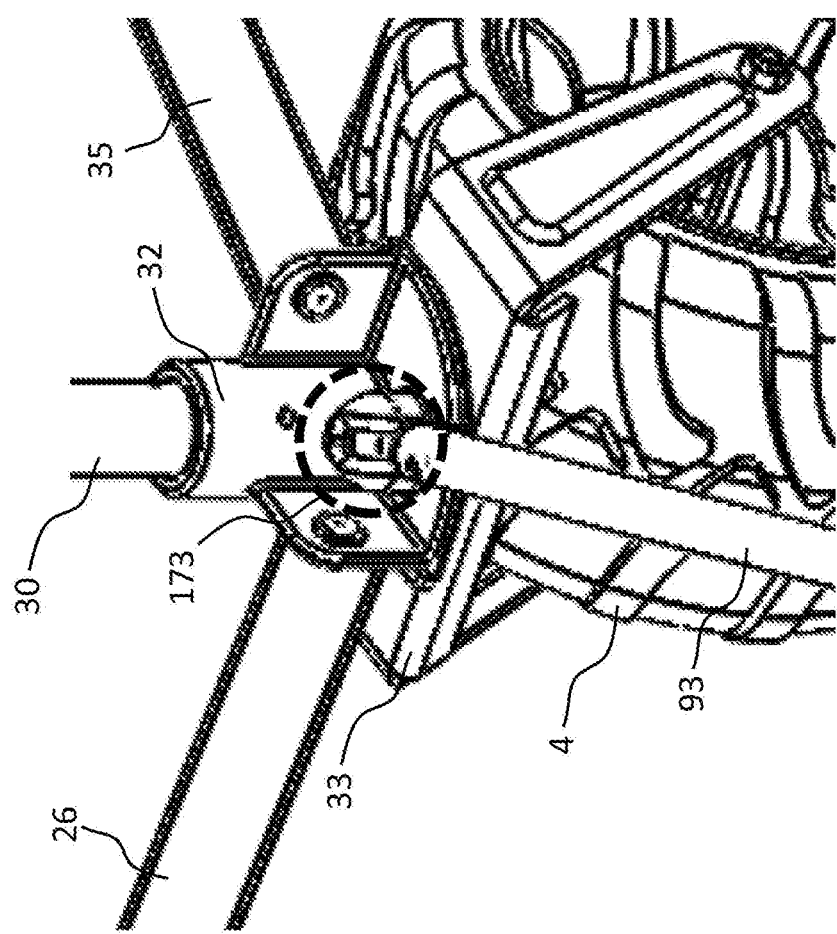
FIG. 6 shows a diagram of an exemplary lower hinge element of the folding wagon of FIG. 1, according to one implementation of the present disclosure.

FIG. 6 shows a diagram of lower hinge element 32, according to one implementation of the present disclosure. Base support element 93 hingedly connects with lower hinge element 32 at multi-directional hinge 173. In some implementations, base support element 93 may include a ball-shaped end for engaging with a socket portion of multi-directional hinge 173. As shown in FIG. 6, base support element 93 is a round support element and has a ball-shaped end engaged with the socket mounted on lower hinge element 32. The configuration allows base support element 93 to rotate around the longitudinal axis of base support element 93, and to move through horizontal and vertical angles, allowing a range of motion that enables the most compact configuration when folding wagon 1 is folded into the collapsed configuration. Lower hinge elements 31, 33, and 34, and their associated components, are similar to lower hinge element 32 shown in FIG. 6.

Figure 7:
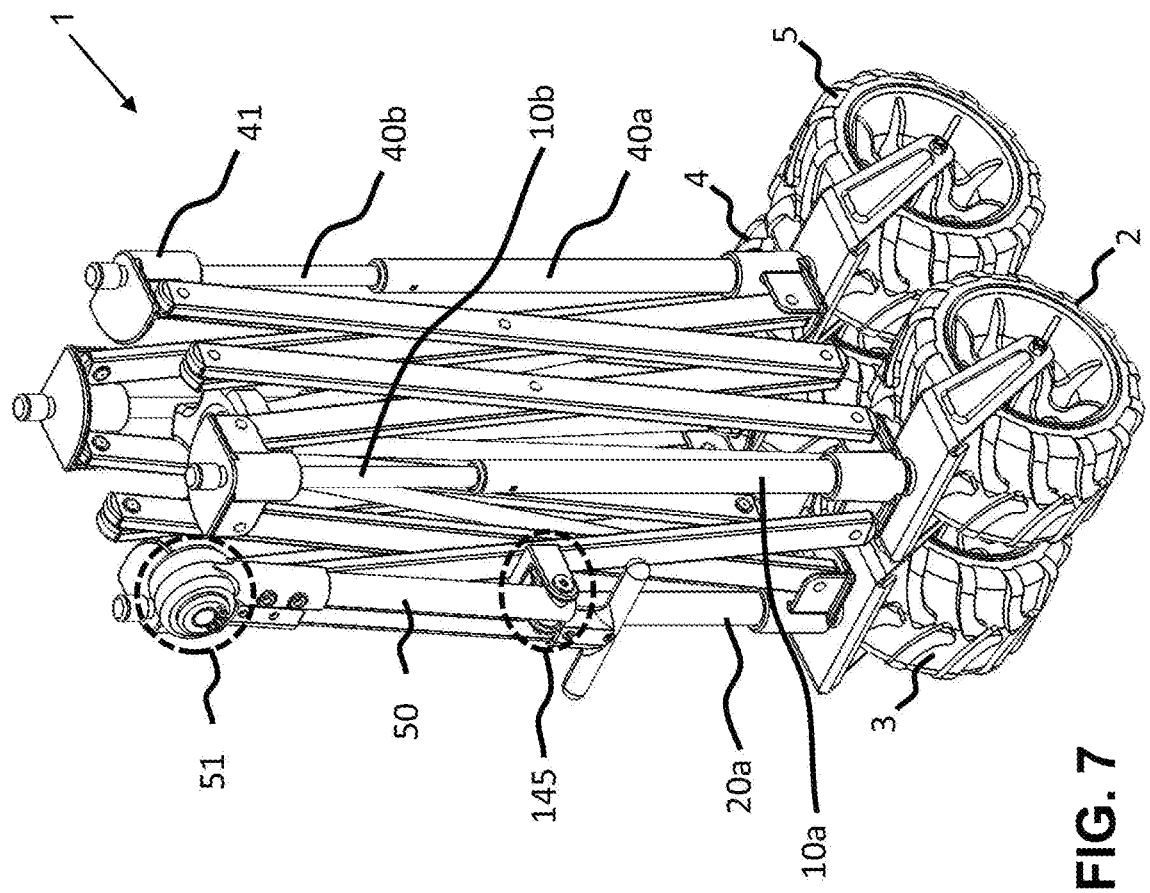
FIG. 7 shows a diagram of the folding wagon of FIG. 1 in a collapsed configuration, according to one implementation of the present disclosure.

FIG. 7 shows a diagram of folding wagon 1 in a collapsed configuration, according to one implementation of the present disclosure. To transform folding wagon 1 from the extended configuration shown in FIG. 1 to the collapsed configuration shown in FIG. 7, the user may displace central base element 90 upwardly, and move central base element 90 from the plane of the base of folding wagon 1 towards a plane containing upper hinge elements 11, 21, 31, 41. As central base element 90 is displaced upwardly, base support elements 91, 92, 93, 94 may draw vertical frame elements 10, 20, 30, 40 towards a center of folding wagon 1. Transforming folding wagon 1 from the extended configuration to the collapsed configuration reduces the distance between the ends of folding wagon 1 by collapsing the folding sides, and reduces the distance between the sides of folding wagon 1 by collapsing the folding ends. The result is that folding wagon 1 is collapsed by drawing the corners of folding wagon 1 together towards the center of folding wagon 1, where the center of folding wagon 1 is the region that is about half the distance between the folding ends and about half the distance between the folding sides. As vertical frame elements 10, 20, 30, 40 are drawn together, folding elements 14 and 15 pivot around folding joint 101; folding elements 24 and 25, and 26 and 27, pivot around folding joints 201 and 203, respectively; folding elements 34 and 35 pivot around folding joint 301; and folding elements 44 and 45, and 46 and 47, pivot around folding joints 401 and 403, respectively, collapsing each folding end and each folding side of folding wagon 1.

As folding wagon 1 is collapsed and the folding members pivot around the folding joints, each vertical element 10, 20, 30, 40 extends to accommodate the necessary change in distance between the lower hinge elements and the upper hinge elements. As shown in FIG. 7, each vertical frame element 10, 20, 30, 40 includes a telescopic extension, wherein vertical frame element 10 includes outer vertical frame element 10a and inner vertical frame element 10b. Vertical frame elements 20, 30, 40 include corresponding inner and outer vertical frame elements. Extendable canopy supports 146, 147, 148, 149 are nested inside, and telescopically extend from, within the inner vertical frame elements.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A tblding wagon having four corners and comprising:
   a collapsible wagon basket;
   a folding wagon frame supporting the collapsible wagon basket, the folding wagon frame comprising:
   a first folding end and a second folding end:
   a first folding side and a second folding side;
   wherein the folding ends and the folding sides connect at the four corners of said folding wagon, each corner comprising a. vertical frame element having an upper end and a lower end, wherein the vertical frame elements are extendable to enable the folding the wagon to transform from an extended configuration to a collapsed configuration; and a folding base including a central base element and a plurality of base support elements having first and opposite ends and a longitudinal axis, each of said plurality of base support elements being pivotally connected at the first end thereof at a first multi-directional ball-and-socket hinge to said central base element and being pivotally connected at the opposite end thereof at a second multi-directional ball-and-socket hinge to the lower end of a respective vertical frame element at one of the four corners of said folding wagon, such that each of said plurality of base support elements is rotatable between said first and second multi-directional ball-and-socket hinges around the longitudinal axis thereof and said plurality of rotatable base support elements are rotatable independently of one another at said second multi-directional ball-and-socket hinges through an angle lying between perpendicular aligned horizontal and vertical planes by which said central base element moves upwardly, said plurality of base support elements rotate upwardly with said central base element towards said vertical frame elements, and said vertical frame elements n ove inwardly towards one another, whereby said folding wagon is transformed from said extended configuration to said collapsed configuration;

a handle pivotally attached to the first folding cud of said folding wagon; and a plurality of wheels attached to the folding wagon frame below the folding base thereof.

2. The folding wagon of claim 1, further comprising extendable canopy supports, wherein the extendable canopy supports extend from each of the vertical frame elements at each of the four corners of the folding wagon frame, and wherein the canopy supports extend to hold a canopy in place.

3. The folding wagon of claim 1, wherein the first folding end includes a first folding member and a second folding member, wherein the first and second folding members cross diagonally across the first folding end, and the second folding end includes a third folding member and a fourth folding member, wherein the third and fourth folding members cross diagonally across the second folding end.

4. The folding wagon of claim 1, wherein the each of the folding sides comprises a first side member, a second side member, a third side member, and a fourth side member, wherein the first side member, is movably connected to the upper end of a vertical frame element of the first folding end and movably connected to the third side member at a lower folding joint, the second side member is movably connected to the lower end of the vertical frame element of the first folding end and movably connected to the fourth side element at an upper folding joint, and wherein the third side element is movably connected to the lower folding joint and is movably connected to the upper end of a vertical frame element of the second folding end and the fourth side element is movably connected to the upper folding joint and is movably connected to the lower end of the vertical frame element of the second folding end.

5. The folding wagon of claim 1, wherein, when the folding wagon is in the collapsed configuration, the base support elements are substantially vertical and extend downward from the central base element to the lower ends of the vertical frame elements.

6. The folding wagon of claim 1, wherein the handle is a collapsible handle having an extended configuration and a collapsed configuration.

7. The folding wagon of claim 6, wherein said collapsible handle has first and opposite ends and a folding joint located therebetween, the first end of said collapsible handle being rotatable at said folding joint relative to said opposite end by which said collapsible handle is folded from said extended configuration to said collapsed configuration.

8. A folding wagon having four corners and comprising:
a collapsible wagon basket;
a folding wagon frame supporting the collapsible wagon basket, the folding wagon frame comprising:
a first folding end and a second folding end;
a first folding side and a second fblding side;
wherein the folding ends and the folding sides connect at the four corners of said folding wagon, each corner comprising a vertical frame element having an upper end and a lower end, wherein the vertical frame elements are extendable to enable the folding the wagon to transform from an extended configuration to a collapsed configuration; and a folding base including a central base element and a plurality of base support elements having first and opposite ends and a longitudinal axis, each of said plurality of base support elements being pivotally connected at the first end thereof at a first multi-directional ball-and-socket hinge to said central base element and being pivotally connected at the opposite end thereof at a second multi-directional ball-and-socket hinge to the lower end of a respective vertical frame element at one of the four corners of said fblding wagon, such that each of said plurality of base support elements is rotatable between said first and second multi-directional ball-and-socket hinges around the longitudinal axis thereof and said plurality of rotatable base support elements are rotatable independently of one another at said second multi-directional ball-and-socket hinges through an angle lying between perpendicular aligned horizontal and vertical planes by which said central base element moves upwardly, said plurality of base support elements rotate upwardly with said central base element towards said vertical frame elements, and said vertical frame elements move inwardly towards one another, whereby said folding wagon is transformed from said extended configuration to said collapsed configuration;

a collapsible handle having a first end pivotally connected to said folding wagon frame at a pivot joint and an opposite second end connected to said first end at a folding joint such that said first end is rotatable at said folding joint through an angle of 180 degrees from an axially extended position at which said first and opposite second ends lie end-to-end with respect to one another to a folded position at which said first and opposite second ends lie adjacent one another, and wherein said handle being rotatable at said pivot joint when the first end of said handle is in said axially extended position relative to the second opposite end thereof; and a plurality of wheels attached to the folding wagon fame below the folding base thereof.

* * * * *